Jan. 4, 1938. S. KRAHL 2,104,083

TRAP FOR RODENTS

Filed Feb. 23, 1937

INVENTOR.
STEVE KRAHL
BY
ATTORNEY.

Patented Jan. 4, 1938

2,104,083

UNITED STATES PATENT OFFICE 2,104,083

TRAP FOR RODENTS

Steve Krahl, Weimar, Tex.

Application February 23, 1937, Serial No. 127,012

2 Claims. (Cl. 43—78)

This invention relates to traps and more particularly to types adapted to kill rats, mice, etc., that may enter and touch the bait.

One object of this invention is to provide a simple trap composed entirely of metal capable of being subjected to heat or fumigation whereby the smell of a previously killed animal may be entirely abolished.

A further feature is in the provision of a mechanical trap by which an intruding rodent will be instantly crushed upon the springing of the trap.

Another purpose is to produce a trap having a safe and effective means embodied in a structure not easily or likely to become disordered by repeated use.

These advantageous objects are attained by the novel and practical combination and arrangement of parts hereinafter described and shown in the annexed drawing forming a material part of this disclosure and in which:—

Figure 1:
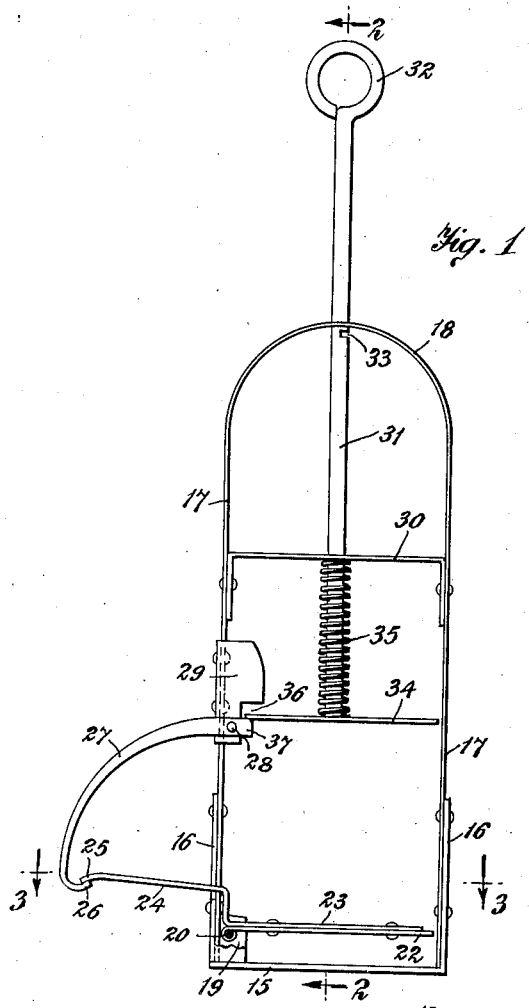
Figure 1 is a side elevational view of an embodiment of the invention as being set and ready for operation.
Figure 2:
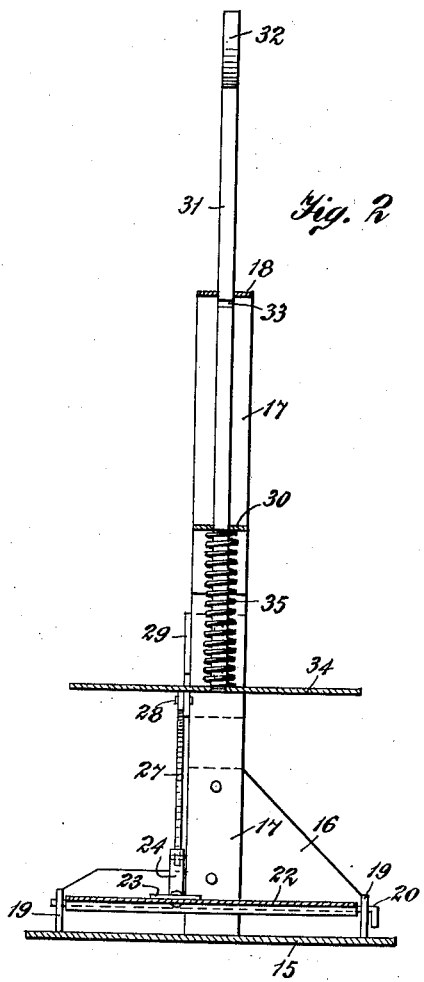
Figure 2 is a longitudinal sectional view taken on line 2—2 of Figure 1.
Figure 3:
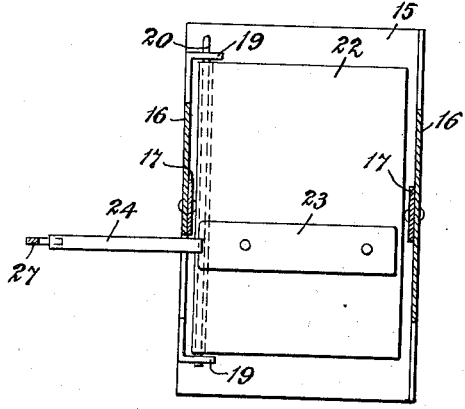
Figure 3 is a transverse sectional view taken on line 3—3 of Figure 1.

Referring in greater detail to the drawing, the level base 15 of the trap is provided with raised side flanges 16, to the inner side of which are riveted the lower portions of a narrow frame 17 having an arcuate top 18.

One of the base sides 17 is extended in length and bent inwardly to form brackets 19, pierced in alinement to receive a rod 20 arranged for ready removal, and on which is hingedly secured a flat rectangular platform 22.

Riveted crosswise on the plate is a narrow strip 23 having a raised, reduced trigger-like catch 24, its outer extremity 25 being downbent to engage in the hook shaped terminal 26 of a curved lever 27, pivoted at 28 to a bracket 29 fixed on the frame 17.

A cross connecting brace 30 is secured between the frame sides at a point above the bracket 29, this brace having a central opening through which a rod 31 is free to pass, the rod continuing through a similar opening in the frame arch 18, to a pull eye 32.

A notch 33 in the rod 31 is engageable with the edge of the opening in the frame arch whereby the rod may be held stationary at will by the operator.

Fixed on the bottom of the rod is a stiff rectangular plate 34, pressed normally downward by a compression spring 35 encircling the rod and abutting the brace 30.

The plate 34 is limited in moving upward by a notch 36 in the bracket 29, one edge of the plate being pressed by the spring 35 against the inreaching portion 37 of the lever 27, which is held from movement, when the trap is set, due to its engagement by the catch 24.

In operation, a bait or lure is fixed on the platform 22, the rod 31 being drawn upwardly and the spring held in compression by moving the notch 33 to engage the frame.

Thereafter the trigger catch elements 25 and 26 are engaged, the rod 31 moved to clear the notch 33 and the plate 34 permitted to rest on the lever projection 37 under pressure of the spring.

It will now be apparent that upon an animal tampering with the lure on the platform, the trap catch 24 will release the lever 27 permitting the plate 34 to be forced violently towards the platform, crushing the animal thereon.

Having thus described the invention and set forth the manner of its construction and use, what is claimed as new and sought to secure by Letters Patent, is:—

1. An animal trap comprising a base, a raised open frame thereon, a lure carrying platform hinged at one edge to one of the sides of said frame, an arm on said platform extending outwardly beyond the frame, a lever pivoted to the frame above said platform and having a part engageable with said arm, an upright rod slidable centrally through said frame, means to retain said rod in a raised position, a plate fixed on the lower end of said rod, said plate normally resting on an inreaching projection of said lever, and a spring coiled around said rod to press said plate downwardly.

2. In a trap for dispatching small animals, a base having a raised open arched frame, a platform hinged to one side of said frame over the base, an outwardly extending catch arm fixed on said platform, a curved lever pivoted to said frame above the platform hinge, said lever having a part adapted to engage the end of said arm and another part reaching into the space over said platform, a rod slidable centrally through said frame, a guide for said rod, means in said rod to retain it in a raised position, a crusher plate fixed on the inner end of said rod, said plate normally resting on the inreaching part of said lever, means to prevent excessive rise of said plate, and a compression spring encircling said rod to press said plate downwardly when said arm and lever are disengaged.

STEVE KRAHL.